Aug. 2, 1932.  L. R. ALLISON  1,869,364

REACTOR

Filed Jan. 6, 1932

INVENTOR.
Leslie R. Allison

By  *[signature]*

HIS ATTORNEY.

Patented Aug. 2, 1932

1,869,364

UNITED STATES PATENT OFFICE

LESLIE R. ALLISON, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA

REACTOR

Application filed January 6, 1932. Serial No. 585,062.

My invention relates to reactors of the iron core type, and has for an object the provision of novel and improved means for varying the permeability of the core and thereby varying the inductance of the reactor. My invention is suitable for use either with simple reactors of the single winding type, or to transformers.

When an iron core reactor is used with a fixed capacitance to obtain resonance at a given frequency, the method of tuning usually followed is to keep the number of turns in the reactor fixed and vary the air gap in the reactor core by the insertion or removal of non-metallic shims or spacers. According to my invention these shims are rendered unnecessary, and the permeability of the core may be varied by merely shifting one portion of the core transversely with respect to another portion.

I will describe one form of reactor embodying my invention, and will then point out the novel features thereof in claims.

Figure 1:
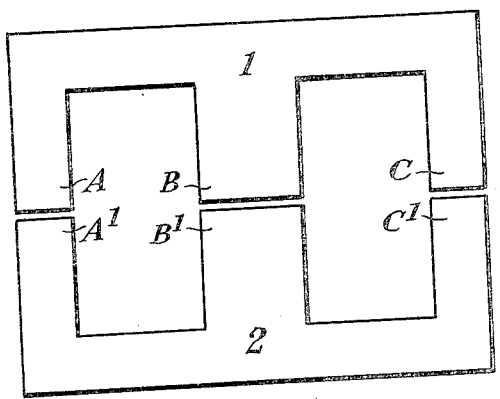
Figure 2:
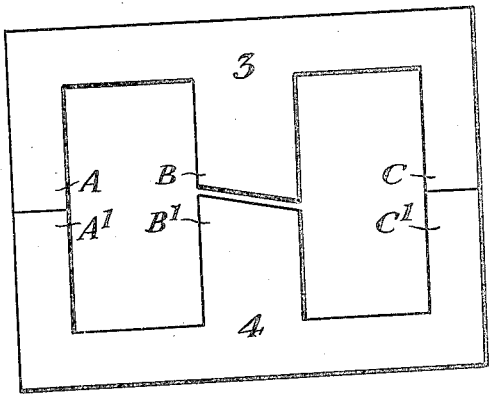
Figure 3:
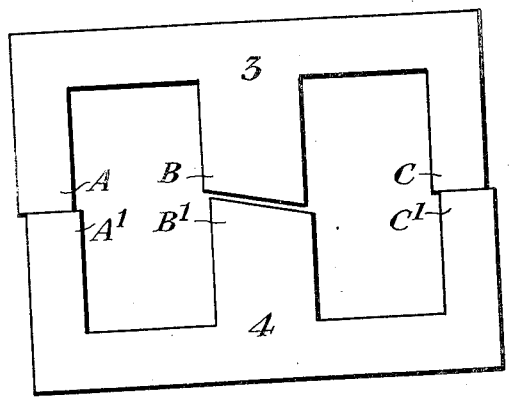
Figure 4:
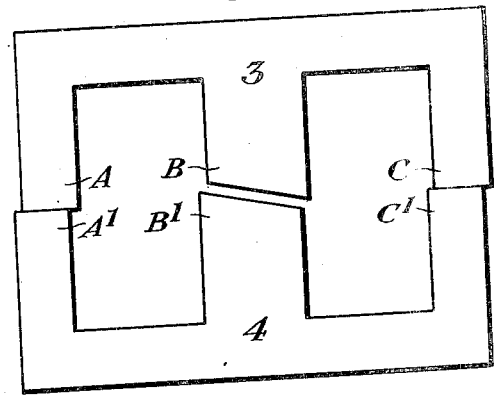
Figure 5:
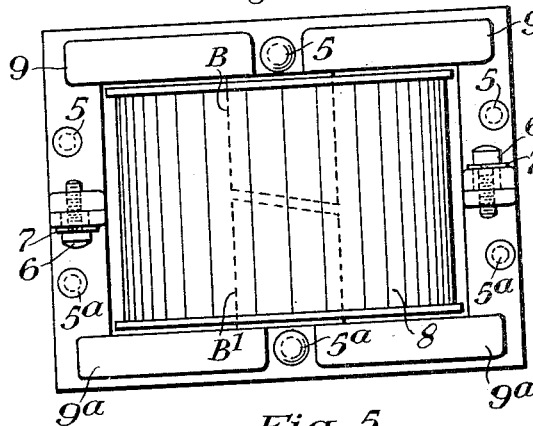
Figure 6:
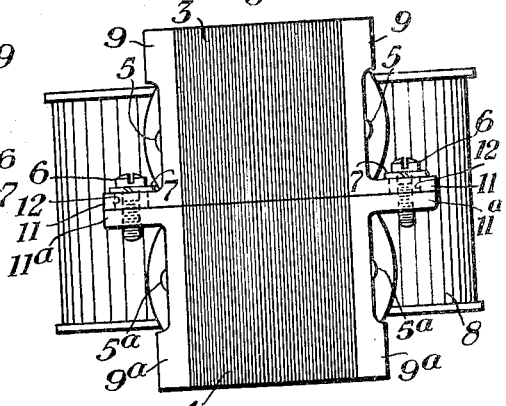

In the accompanying drawing, Fig. 1 is a view showing a reactor core of the type now commonly used. Fig. 2 is a view showing one form of reactor core embodying my invention. Figs. 3 and 4 are views similar to Fig. 2, but showing the core members in different relative positions. Fig. 5 is a front view, and Fig. 6 is a side view, showing a complete reactor embodying the core illustrated in Figs. 2, 3 and 4.

Similar reference characters refer to similar parts in each of the views.

Referring first to Fig. 1, the core illustrated in this view comprises two E-shaped members 1 and 2 mounted with their ends confronting each other, thereby providing three air gaps A—A$^1$, B—B$^1$ and C—C$^1$. In order to vary the permeability of this core, shims or spacers must be inserted or removed from the two outside air gaps. Before a reading is taken to determine proximity to resonant condition, the two halves of the core must be rigidly clamped together. If too many spacers have been inserted it is necessary to separate the two halves of the core, remove some of the spacers, retighten the clamping screws, and repeat the test. If it is found that too many spacers have been removed, the process must be repeated, this time inserting more spacers. Before the proper permeability is reached, the process may have to be gone over repeatedly at the cost of considerable time. Furthermore, even though spacers of only a few mils. in thickness are used, a reactor which tunes above the proper frequency may tune below it when a single spacer is removed. In such cases, it is necessary to resort to a special spacer of fractional thickness, and this is undesirable because it will introduce a mechanical stress which tends to distort the core when it is clamped. Furthermore, the best results are secured when the core is balanced, that is, when air gaps A—A$^1$ and C—C$^1$ are equal. To tune a circuit by the method hereinbefore described and at the same time maintain the two outer air gaps equal in length, involves a large amount of time and labor. Another factor is that if a body of iron is brought close to either of the outer air gaps A—A$^1$ or C—C$^1$, the effective length of such air gap will be reduced and the circuit in which the reactor is used will be detuned. This is especially likely to occur when one or both of the outer air gaps lies close to an iron framework or box enclosing the reactor. Also, a body of metal, either magnetic or non-magnetic, brought close to either outer air gap, may distort the tuning because eddy current losses may be introduced due to the leakage flux surrounding the outer air gaps.

Referring now to Fig. 2, the core shown in this view involves two E-shaped members 3 and 4, the confronting faces of the outer legs being perpendicular to the axes of the legs, as before, but the confronting faces of the inner legs being separated by an air gap which lies in a plane forming an angle with the confronting faces of the other legs. The confronting faces A, A$^1$, and C, C$^1$, are in actual contact, and are ground smooth in order to reduce the reluctance at these points to a minimum; and the air gap B—B$^1$ is equivalent to the three air gaps provided in the structure shown in Fig. 1. The laminations are so designed that for approximate tuning the upper and lower core sections will register as shown in Fig. 2. Accurate tuning is accomplished by simply shifting one core section laterally with respect to the other. If greater inductance is desired, the air gap B—B¹ is reduced by shifting core section 3 to the left with relation to section 4, so that the parts occupy the relative positions in which they are shown in Fig. 3. If less inductance is desired, core section 3 is moved to the right relative to section 4, so that the parts then occupy the relative positions in which they are shown in Fig. 4.

The value of the angle between the faces of the middle legs and the horizontal is determined entirely by practical considerations. From a theoretical standpoint, it may be any angle between the horizontal and vertical, but it is evident that the smaller the angle the greater will be the lateral shift required for a unit change in the air gap, whereas the larger the angle the more sensitive the air gap will become to changes in the relative core member positions. I have found by actual test that with a nominal air gap of 0.014″, an angle of 7° is satisfactory. With a permissible lateral shift of 0.04″ either way from the center, this will provide a change in air gap length of plus or minus 0.00488″; that is, plus or minus 34.8% from the center position.

From an inspection of Figs. 3 and 4, it is evident that when one core is shifted with relation to the other, overlapping of the confronting faces will occur, and the effective area of the iron section will be reduced at A, A¹ and at C, C¹. I have found by experiment, that for a change in air gap length of plus or minus 34.8%, this decrease in area of the iron section is so small as to produce no noticeable loss in output.

Referring now to Figs. 5 and 6, the laminations 3 are clamped together between end brackets 9, by means of rivets 5; whereas, the laminations 4 are clamped together between end brackets 9ᵃ by means of rivets 5ᵃ. These brackets are provided with apertured and threaded lugs 11ᵃ, and with cooperating lugs 11 having elongated holes 12 registering with the threaded holes in the lugs 11ᵃ. Screws 6 pass through the elongated holes 12 and co-act with the threaded holes in the lugs 11ᵃ. Nut locks 7 may be provided to prevent these screws from turning when the parts are clamped together. The elongated holes 12 are disposed in such direction as to permit of the lateral shifting of the core members 3 and 4, referred to hereinbefore. After the air gap B, B¹ has been adjusted to the desired value, the core members are clamped rigidly together by means of the screws 6. The winding, which is hereby designated 8, surrounds the inner legs of the two core members, and may be either a single reactor winding or the primary and secondary of a transformer.

Due to the elimination of the air gaps in the outer legs of the core, it is evident, by a comparison with Fig. 1, that a reactor embodying my invention is subject to less flux leakage than with the type now commonly used. It follows that for the same air gap greater inductance may be obtained by a reactor embodying my invention. Other advantages of my invention over the prior standard practice, are as follows:

1. The tuning operation is simplified and requires much less time.
2. The method of tuning is more precise.
3. Less apparatus is required for tuning.
4. The reactor characteristics are unaffected by the presence of neighboring metal.
5. The use of spacers is abolished.
6. The reactor has greater stability, because, for a unit change in the single longer air gap, the percentage change of inductance is smaller.
7. The degree of balance between the two parallel magnetic paths is not affected by the tuning operation.

Although I have herein shown and described only one form of reactor embodying my invention, it is understood that various changes and modifications may be made therein within the scope of the appended claims without departing from the spirit and scope of my invention.

Having thus described my invention, what I claim is:

1. A reactor core comprising two E-shaped core members mounted with the free ends of one member confronting the free ends of the other member, the confronting faces of the outer legs being perpendicular to the axes of the legs and always in mutual contact, and the confronting faces of the middle legs being spaced by an air gap the plane of which makes an angle of other than 90° with the axes of the legs, and means for mounting said members for relative movement in a plane perpendicular to the axes of the legs, whereby the entire air gap of the core is between the middle legs and this air gap may be varied by shifting one member transversely with respect to the other.

2. A reactor core comprising two E-shaped core members mounted for relative transverse movement and arranged with the free ends of one member confronting the free ends of the other member, the confronting faces of the outer legs being cut so that they remain in surface contact during such movement, and the confronting faces of the inner legs being cut so that the air gap between them changes during such relative movement.

In testimony whereof I affix my signature.

LESLIE R. ALLISON.